US006832713B2

(12) United States Patent
Kano et al.

(10) Patent No.: US 6,832,713 B2
(45) Date of Patent: Dec. 21, 2004

(54) SPOT JOINING METHOD AND SPOT JOINING DEVICE

(75) Inventors: Yuzo Kano, Kobe (JP); Masayuki Inuzuka, Ikeda (JP); Seiichiro Yamashita, Kobe (JP); Yasumasa Nakashima, Nagoaka (JP); Yasuhide Nagao, Kobe (JP); Tomoyuki Iwashita, Hiroshima (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 92 days.

(21) Appl. No.: 09/847,643

(22) Filed: May 2, 2001

(65) Prior Publication Data

US 2001/0045447 A1 Nov. 29, 2001

(30) Foreign Application Priority Data

May 8, 2000 (JP) ........................................ 2000-135106

(51) Int. Cl.[7] ........................ B23K 20/12; B23K 37/00; B23K 31/02
(52) U.S. Cl. ..................................... 228/2.1; 228/112.1
(58) Field of Search .............................. 228/112.1, 2.1; 156/580

(56) References Cited

U.S. PATENT DOCUMENTS

| | | | |
|---|---|---|---|
| 3,429,306 A | | 2/1969 | Thompson |
| 3,503,379 A | | 3/1970 | Kuhn et al. |
| 5,460,317 A | * | 10/1995 | Thomas et al. .......... 228/112.1 |

(List continued on next page.)

FOREIGN PATENT DOCUMENTS

| | | |
|---|---|---|
| DE | 197 3 638 A1 | 1/1999 |
| DE | 197 31 638 A | 1/1999 |
| JP | 7-505090 | 6/1995 |
| JP | 9-508074 | 8/1997 |
| JP | 10-263852 | 10/1998 |
| JP | 2002-120077 A * | 4/2002 |
| WO | WO 98 04381 A | 2/1998 |
| WO | WO 98/04381 | 2/1998 |
| WO | WO 99/54081 * | 10/1999 |
| WO | WO 01 28732 A | 4/2001 |
| WO | WO 01/36144 A1 | 5/2001 |

OTHER PUBLICATIONS

Copy of European Search Report dated April 15, 2002 in counterpart foreign European Patent Application No. EP 01 30 4123.

*Primary Examiner*—L. Edmondson
(74) *Attorney, Agent, or Firm*—Marshall, Gerstein & Borun LLP

(57) ABSTRACT

A spot joining device comprises a joining tool, an induction motor for rotating the joining tool, a servo motor for vertically moving the joining tool along an axis of the joining tool, and a receiving member placed opposite to the joining tool. The joining tool includes a short-column shaped shoulder and a pin protruded downwardly along the axis from a central portion of a lower face of the shoulder at a tip end portion thereof. Two works such as aluminum alloy plates are lapped and placed on a receiving member. When the joining tool is rotated and moved downwardly, a joint spot of the works is heated and softened due to friction heat generated by the rotating pin. Thereby, plastic flow occurs in the vicinity of the joint spot. The vicinity of the joint spot is stirred and the works are fused at the joint spot. Thus, the works are spot-joined.

21 Claims, 4 Drawing Sheets

U.S. PATENT DOCUMENTS

| | | | |
|---|---|---|---|
| 5,697,544 A | * 12/1997 | Wykes | 156/580 |
| 5,813,592 A | * 9/1998 | Midling et al. | 156/580 |
| 5,893,507 A | * 4/1999 | Ding et al. | 156/580 |
| 5,964,233 A | 10/1999 | Clark et al. | |
| 6,045,027 A | * 4/2000 | Rosen et al. | 228/112.1 |
| 6,045,028 A | * 4/2000 | Martin et al. | 228/112.1 |
| 6,050,474 A | * 4/2000 | Aota et al. | 228/112.1 |
| 6,050,475 A | * 4/2000 | Kinton et al. | 144/142 |
| 6,053,391 A | * 4/2000 | Heideman et al. | 228/112.1 |
| 6,102,031 A | 8/2000 | Waters | |
| 6,164,273 A | 12/2000 | Waters | |
| 6,192,878 B1 | 2/2001 | Waters | |
| 6,247,633 B1 | * 6/2001 | White et al. | 228/112.1 |
| 6,299,050 B1 | * 10/2001 | Okamura et al. | 228/110.1 |
| 6,302,315 B1 | * 10/2001 | Thompson | 228/112.1 |
| 6,325,273 B1 | * 12/2001 | Boon et al. | 228/112.1 |
| 6,367,681 B1 | * 4/2002 | Waldron et al. | 228/112.1 |
| 6,536,651 B2 | * 3/2003 | Ezumi et al. | 228/112.1 |
| 6,585,443 B2 | * 7/2003 | Aota et al. | 403/270 |
| 6,601,751 B2 | * 8/2003 | Iwashita | 228/112.1 |
| 6,604,667 B2 | * 8/2003 | Schilling et al. | 228/112.1 |
| 2003/0029903 A1 | * 2/2003 | Kashiki et al. | 228/112.1 |

\* cited by examiner

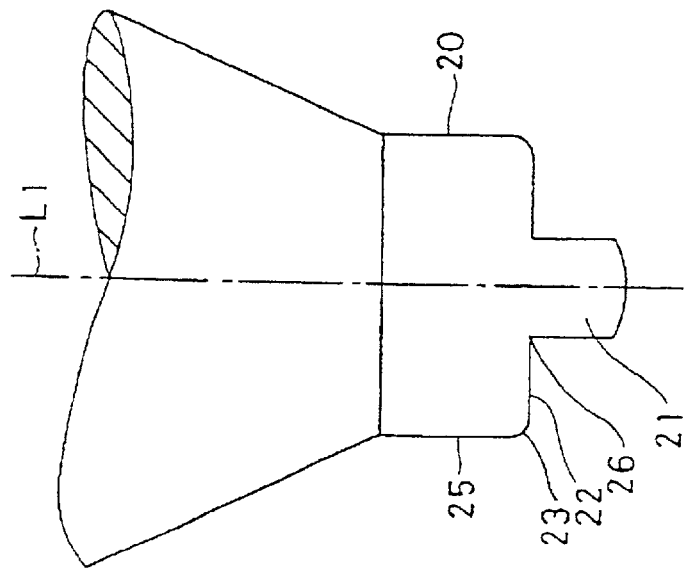
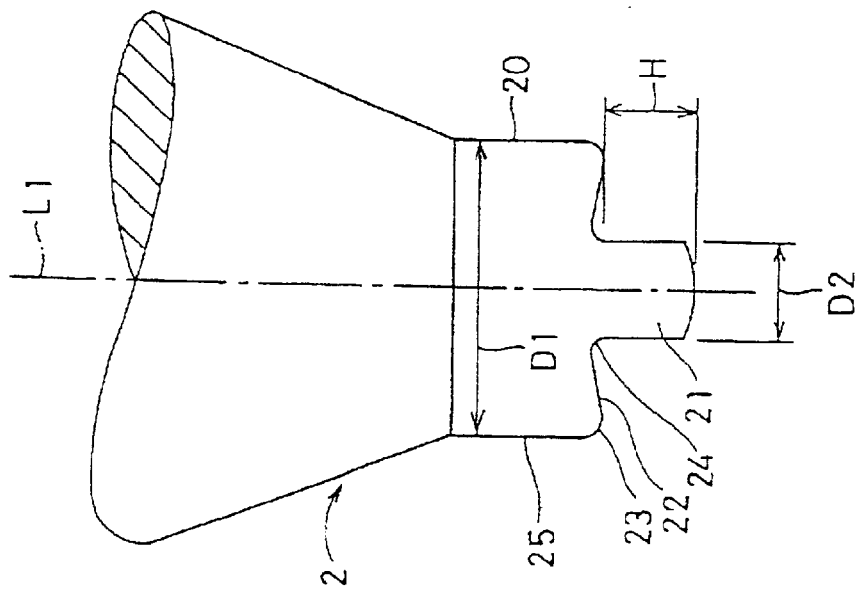
Fig. 2A
Fig. 2B

SPOT JOINING METHOD AND SPOT JOINING DEVICE

BACKGROUND OF THE INVENTION

1. Field of the Invention

The present invention relates to a spot joining method and a spot joining device for spot joining of works made of aluminum alloy or the like.

2. Description of the Related Art

Conventionally, as a method for spot joining of plates made of aluminum alloy or the like, there have been a resistance spot welding method, a mechanical fastening method using rivets, and the like.

In the resistance spot welding method, there exist problems in running cost and quality control, including a need for a power supply of a large capacity in spot joining, short life duration of welding electrodes due to contamination or wear-out, and a need for utilities such as water and air in addition to a welding power.

In the resistance spot welding method, since indentations remain on joined portions, this method is undesirable when applied to outer plates for automobile because its external appearance is lessened.

In particular, in the resistance spot joining of works made of the aluminum alloy, since the electrodes significantly wear out, the ability to perform continuous spotting is low. When current is conducted, it flows through spots close to a spot to be conductive, that is, current is shunted. Hence, it is impossible to place the spots close to one another. For this reason, it is impossible to obtain required strength.

Meanwhile, riveting requires a number of rivets as wear-out members.

SUMMARY OF THE INVENTION

The present invention has been developed for obviating the above-described problem and an object of the present invention is to provide a spot joining method and a spot joining device in which quality control is easily performed, running cost is improved, and no indentations remain on joined portions.

According to the present invention, there is provided a spot joining method comprising the steps of: rotating a joining tool having a pin at a tip end portion thereof around an axis of the joining tool with the pin pressed against a predetermined joint spot of lapped works to be joined, the pin being protruded along the axis; inserting the pin into the predetermined joint spot of the lapped works heated and softened due to friction heat; stirring portions of the lapped works that are in the vicinity of the predetermined joint spot by using the rotating pin and fusing the lapped works at the predetermined joint spot; and pulling out the joining tool along the axis, thereby performing spot joining of the lapped works at the predetermined joint spot.

In this method, two works to be joined are lapped and placed. The joining tool is rotated at a high speed and the pin at the tip end portion thereof is pressed against the joint spot of the lapped works to be joined. Thereby, the joint spot is heated and softened due to friction heat and the pin is inserted thereinto. By further rotating the tool, portions of the works around the pin plastically flow and are stirred. The two works are fused at the joint spot. After pulling out the joining tool, the softened works are solidified and the two works are spot-joined at the joint spot.

Thus, in the spot joining method of the present invention, the joining tool is rotated to generate friction heat for joining the works. Therefore, compared with the resistance spot welding, spot joining can be carried out with a power of a significantly smaller capacity. In addition, utilities other than the power are unnecessary, and the joining tool can be used over a long period of time without the need for maintenance because the joining tool is neither contaminated nor worn out. Therefore, running cost is reduced and management is easily made. Unlike the mechanical fastening method using rivets, since fastening members are unnecessary in the spot joining method of the present invention, cost and weight are not increased.

In this method, a receiving member having a flat receiving face on which the lapped works are placed is provided opposite to the tip end portion of the joining tool to receive a pressing force from the joining tool pushing against the lapped works.

In spot joining, for example, two works to be joined are lapped and placed on the receiving member. From above of the works, the joining tool is rotated and pressed against the works to be joined. The works are supported on the receiving member such that a face of one of the works is pressed against the flat face of the receiving member, and spot joining is performed from the opposite side of the receiving member. A hole is formed on the works as a result of pin insertion, but the face pressed against the flat face of the receiving member is kept flat because the pin is inserted from the opposite side of the receiving member and does not reach the face. After joining, this work can be used as an outer plate.

According to the present invention, there is also provided a spot joining device comprising: a joining tool having a pin at a tip end portion thereof, the pin being protruded along an axis of the joining tool; a first motor for rotating the joining tool around the axis thereof; and a second motor for moving the joining tool along the axis thereof, wherein the joining tool is moved along the axis by the second motor while the joining tool is rotated by the first motor, the pin is pressed against a predetermined joint spot of lapped works to be joined and is inserted into the predetermined joint spot heated and softened due to friction heat, portions of the lapped works that are in the vicinity of the predetermined joint spot are stirred by using the rotating pin, the lapped works are fused at the predetermined joint spot, and the joining tool is pulled out along the axis by the second motor, whereby the lapped works are spot-joined at the predetermined joint spot.

According to this device, the joining tool is rotated by the first motor and is moved along the axis by the second motor. Thereby, plastic flow occurs due to the generated friction heat as described above. Thus, a plurality of works can be spot-joined at joint spots.

In this device, the first motor is one of an induction motor and a servo motor and the second motor is the servo motor.

According to this device, by using the induction motor or the servo motor as the motor for rotating the joining tool around the axis, the joining tool can be rotated at a high speed. Also, by using the servo motor as the motor for moving the joining tool along the axis, a joining depth can be controlled with high precision.

These objects, as well as other objects, features and advantages of the invention will become more apparent to those skilled in the art from the following description with reference to the accompanying drawings.

BRIEF DESCRIPTION OF THE DRAWINGS

FIGS. 2A, 2B are views showing two types of shapes of a tip end portion of a joining tool;

DETAILED DESCRIPTION OF THE PREFERRED EMBODIMENTS

Figure 1:
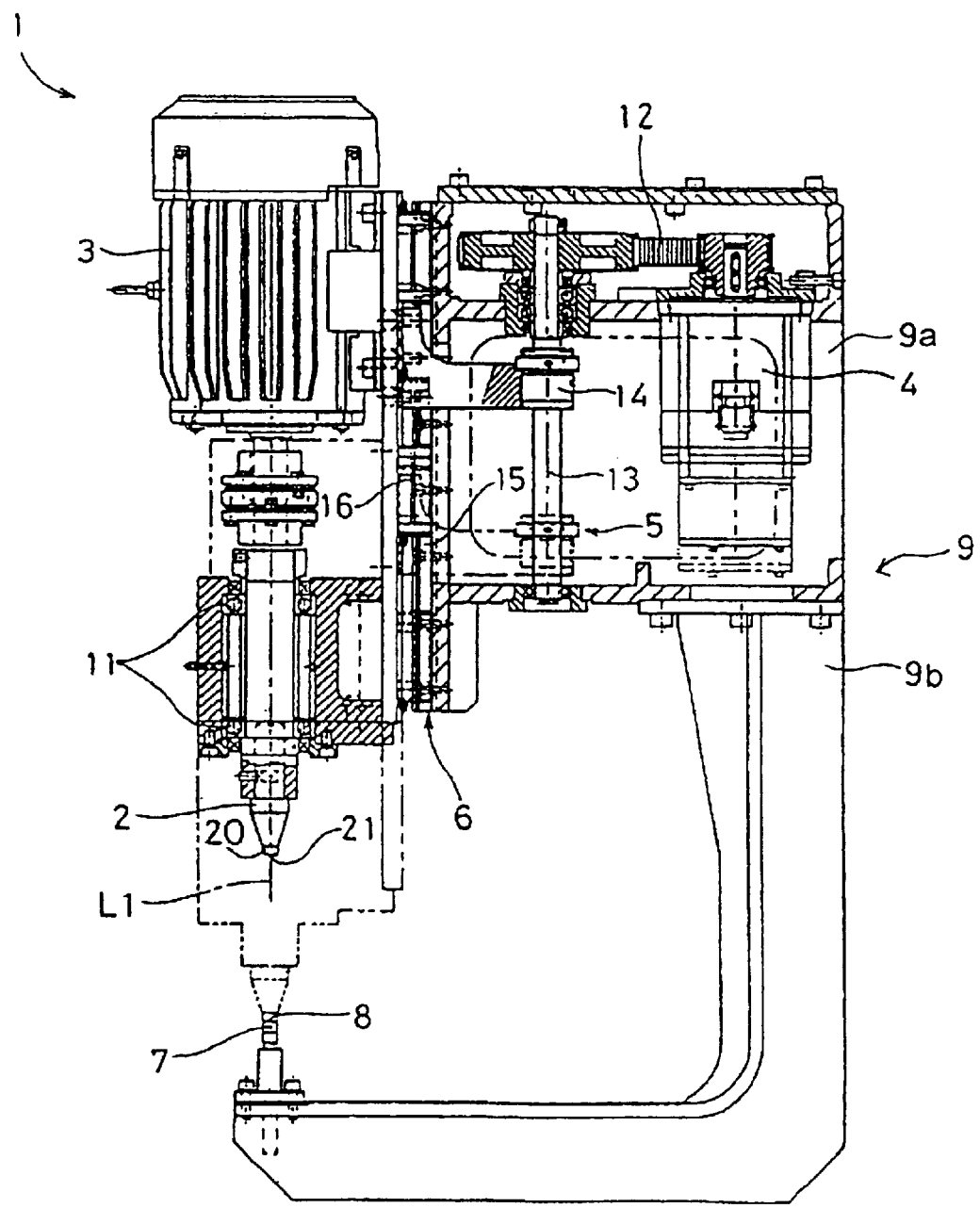
FIG. 1 is a cross-sectional view showing a spot joining device according to an embodiment of the present invention.

FIG. 1 is a cross-sectional view showing a spot joining device 1 according to an embodiment of the present invention. Referring now to FIG. 1, the spot joining device 1 is used to join works such as two aluminum alloy plates by lap joint, and comprises a joining tool 2, an induction motor 3, a servo motor 4, a linear guide 6, a receiving member 7. A frame 9 has a first portion 9a and a second portion 9b fixed to a lower end of the first portion 9a.

The joining tool 2 is supported by means of bearings 11 such that it is rotatable around an axis L1 of the joining tool 2. The joining tool 2 is driven by the induction motor 3 to be rotated around the axis L1 at a high speed. The induction motor 3 is mounted on the frame 9 by means of the linear guide 6 such that it is vertically movable along the axis L1 of the joining tool 2.

The linear guide 6 is mounted on a first portion 9a of the frame 9 and comprises a guide rail 15 extending in parallel with the axis L1 of the joining tool 2 and a guide member 16 movably attached on the guide rail 15. The bearings 11 supporting the induction motor 3 and the joining tool 2 are attached to the guide member 16 of the linear guide 6. Thereby, the joining tool 2 is vertically movable along the axis L1 together with the induction motor 3.

A servo motor 4 and a ball screw 5 are mounted on the frame 9. The servo motor 4 drives a screw shaft 13 of the ball screw 5 through a belt 12, causing the screw shaft 13 to rotate. The screw shaft 13 is placed in parallel with the axis L1 of the joining tool 2. A nut 14 screwed on the screw shaft 13 is vertically moved according to rotation of the screw shaft 13. The nut 14 is attached to the guide member 16 of the linear guide 6. That is, driven by the servo motor 4, the screw shaft 13 of the ball screw 5 rotates, thereby allowing the joining tool 2 to be vertically moved along the axis L1 together with the induction motor 3.

The second portion 9a of the frame 9 is fixed to a lower first portion 9a to extend downwardly in a substantially L-shape and a receiving member 7 is provided at a tip end thereof.

The receiving member 7 is a column-shaped member placed opposite to the joining tool 2 and is disposed coaxially with the axis L1 of the joining tool 2. The receiving member 7 has a flat upper face opposite to the tip end of the joining tool 2. In spot joining, works to be joined are placed on the flat upper face serving as a receiving face 8 subjected to a pressing force from the joining tool 2.

FIGS. 2A, 2B are views showing two types of shapes of the tip end portion of the joining tool 2. The joining tool 2 is conical and downwardly tapered toward a tip end thereof and is provided with a short-column shaped shoulder portion 20 at the tip end thereof. A pin 21 is formed on a lower face 22 of the shoulder portion 20 such that it is protruded from a central portion of the lower face 22 along the axis L1.

The shoulder portion 20 has two types of shapes, i.e., a curved face type shown in FIG. 2A and a flat face type shown in FIG. 2B. As shown in the shape of the curved face type of FIG. 2A, the lower face 22 of the shoulder portion 20 is conically shaped such that it is upwardly recessed at a central portion thereof, and from the most deeply recessed central portion, the pin 21 is protruded downwardly along the axis L1. A corner portion 23 where an outer peripheral face 25 and the lower face 22 of the shoulder portion 20 are connected is smooth and circular-arc shaped and a portion 24 where the lower face 22 and the pin 21 are connected is also smooth and circular-arc shaped. The tip end portion of the pin 21 has a slightly raised central portion.

As shown in the shape of the flat face type of FIG. 2B, the lower face 22 of the shoulder portion 20 is a flat face perpendicular to the axis L1 and has a central portion from which the pin 21 is protruded downwardly. The corner portion 23 where the outer peripheral face 25 and the lower face 22 are connected is smooth and circular-arc shaped like the shape of FIG. 2A but the lower face 22 and the pin 21 form a right angle at a portion 26 where they are connected. Like the shape of FIG. 2A, the tip end portion of the pin 21 has a slightly raised central portion.

An outer diameter D1 of the shoulder portion 20 is, for example, 5–20 mm. An outer diameter D2 of the pin 21 is 2–7 mm and a length H of the pin 21 is 1–3 mm. The joining tool 2 is made of tool steel harder than aluminum alloy of which the works to be welded are made.

Figure 3A:
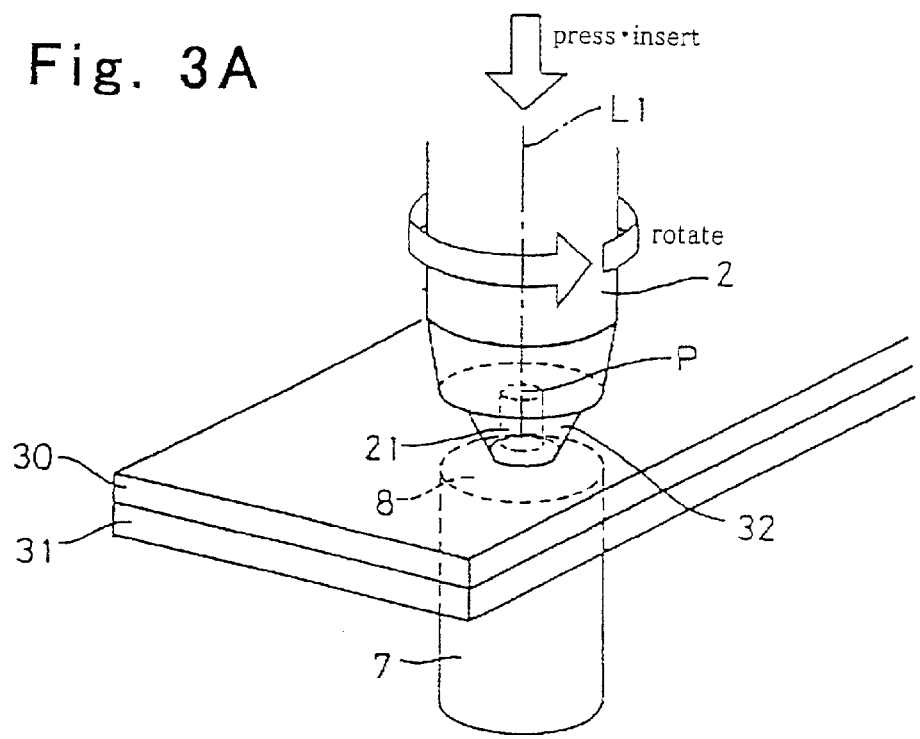
FIGS. 3A, 3B are views showing a spot joining method of the present invention.
Figure 3B:
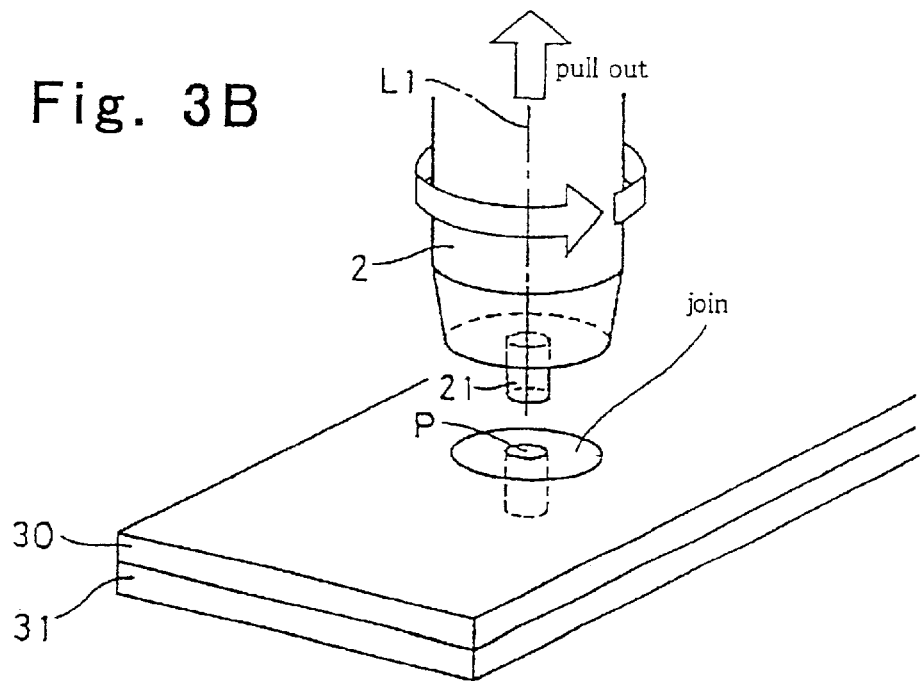

FIGS. 3A, 3B are views showing a spot joining method of the present invention. In this embodiment, works 30, 31 corresponding to two aluminum alloy plates are lap-joined.

First of all, the works 30, 31 are placed on the receiving face 8 of the receiving member 7 such that a joint spot P of the works 30, 31 conforms to the axis L1. Then, the induction motor 3 drives the joining tool 2 to be rotated at a high speed of approximately 1000–3000 rpm, for example.

Subsequently, the rotating joining tool 2 is moved downwardly along the axis L1 by the servo motor 4. When the pin 21 of the joining tool 2 reaches the work 30, the work 30 is heated and softened due to friction generated between the rotating pin 21 and the work 30 and the pin 21 is inserted thereinto. When the pin 21 is inserted, the lower face 22 of the shoulder portion 20 comes into contact with the work 30, and a vicinity of the joint spot P is heated due to friction generated between the lower face 22 and the work 30. Plastic flow is induced as a result of rotation with the pin 21 inserted into the work 30 heated and softened due to friction heat and the vicinity of the joint spot P is stirred by the rotating pin 21.

In this embodiment, the pressing force of the joining tool 2 is set to 300 kgf. The pressing force is received by the receiving member 7.

Thus, after the tip end of the pin 21 passes through a joint face between the works 30, 31 and is inserted just before a rear face of the work 31, the joining tool 2 rotates to stir the vicinity of the joint spot P to be formed into a plastic-flowing area 32 as shown in FIG. 3A. Consequently, the works 30, 31 are fused at the joint spot P.

After stirring for a given time, the joining tool 2 is pulled out as shown in FIG. 3B. The given time is, for example, set to about 1–10 seconds. After the pin 21 is pulled out, the plastic-flowing works are solidified and the works 30, 31 are joined at the joint spot P.

Figure 4:
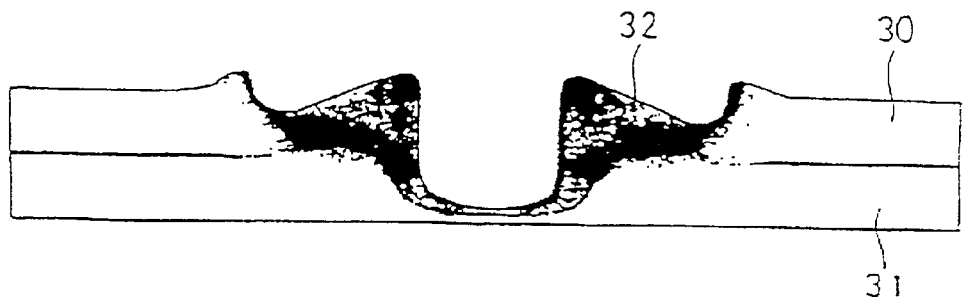
FIG. 4 is a cross-sectional view showing joined works.

FIG. 4 is a view showing a cross section of the joint spot of the joined works 30, 31. As shown in FIG. 4, a concave portion is formed in front surfaces of the works 30, 31 by inserting the pin 21 and the shoulder 20 thereinto from above. The vicinity of the concave portion plastically flows to allow the works 30, 31 to be fused. It is shown that a rear face of the work 31 is kept flat, because the pin 21 is not inserted into the rear face from below. In the example shown in FIG. 4, the shoulder of the curved face type is used.

Figure 5:
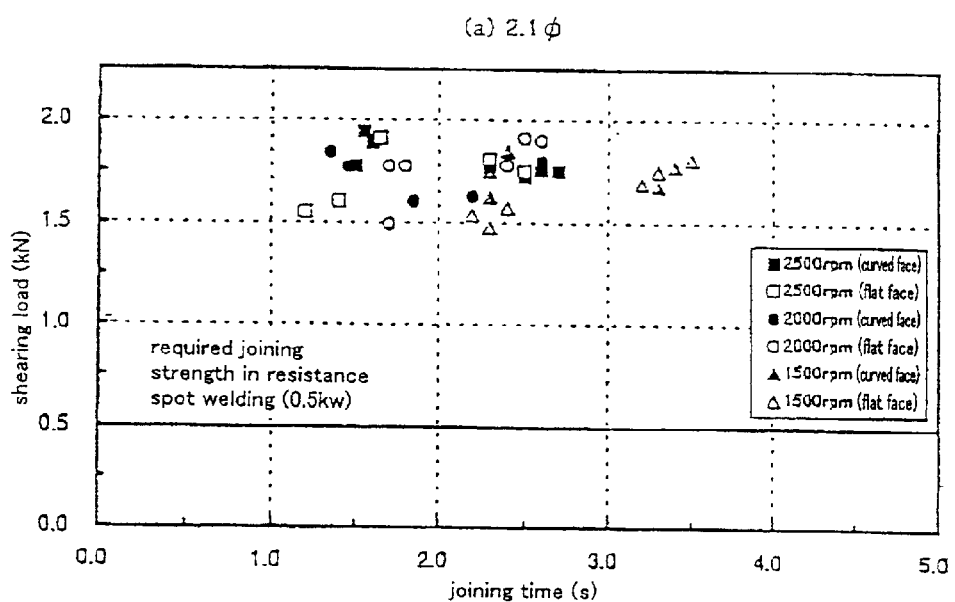
FIG. 5 is a view showing a test result of the spot joining method of the present invention.

FIG. 5 shows a test result of the spot joining method of the present invention. In this test, an automobile member made of aluminum alloy was lap-joined. More specifically, edge portions of a bonnet were joined. In this test, an aluminum alloy plate 0.95 mm thick as an outer work and an aluminum alloy plate 0.9 mm thick as an inner work were joined and required joining strength was set to 0.5 kN or more.

In this test, the pin 21 of 2.1 mm $\phi$ was used. The applied load was kept constant (300 kgf). The number of rotations was set to 1500 rpm, 2000 rpm, or 2500 rpm. The joining tool of the curved face type and the joining tool of the flat face type were used for joining time set in the range of 1.0–3.5s. As shown in FIG. 5, in every test, a preferable result that shearing load greatly exceeded the required joining strength and shearing strength varied less was obtained.

In the spot joining method, since the concave portion is not formed on the face situated on the opposite side of the face into which the tool is inserted and therefore the face on the opposite side is kept flat, spot joining can be performed without lessening external appearance.

The works to be joined are not limited to the works made of aluminum alloy and stainless steel plates can be joined. The works of different types as well as the works of the same type can be joined.

In the spot joining method of the present invention, it is preferable that flat-plate shaped and aluminum alloy works of the same type are lap-joined as described above. Alternatively, three or more works may be lap-joined. Also, the works of different types may be lap-joined. Further, a combination of a plurality of three-dimensionally shaped works may be used and the spot joining method of the present invention may be employed when lapped faces are joined.

While in this embodiment, the induction motor is used as the motor for rotating the joining tool, the present invention is not limited to this and the servo motor may be used. The rotational speed of the joining tool can be controlled with high precision by rotating the joining tool by using the servo motor.

Since it is not necessary to conduct current in the spot joining method of the present invention unlike the conventional resistance spot welding method, the works to be joined need not be metals and works made of synthetic resin and works in which decorative sheets made of synthetic resin are bonded to outer faces of metal plates may be joined.

The spot joining device of the present invention is used as a spot joining gun, which is movably supported by a balancer, for example. An operator performs spot joining operation with the gun. Also, an articulated robot may be equipped with a gun on its wrist and adapted to sequentially perform spot joining of predetermined joint spots according to a teaching program.

As another example of the joining tool, a screw may be formed at the tip end of the pin. This makes it easy that the rotating pin is inserted into the works to be joined.

The spot joining method of the present invention can be applied to not only joining of the automobile member made of aluminum alloy but also joining of a railway vehicle made of aluminum alloy, an aluminum casing, or the like.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function maybe varied substantially without departing from the spirit of the invention and all modification which come within the scope of the appended claims are reserved.

What is claimed is:

1. A spot joining device comprising:
   a joining tool having a column-shaped shoulder portion at a tip end portion thereof and a pin protruding from an end face of the shoulder portion along an axis thereof;
   a frame having a first portion and a second portion fixed to a lower end of the first portion to extend downwardly in a substantially L-shape;
   a linear guide provided on the first portion of the frame for guiding the joining tool to be movable upwardly and downwardly along the axis thereof;
   a rotation motor for rotating the joining tool around the axis thereof;
   a motion motor for moving the joining tool along the axis thereof, and
   a column shaped receiving member provided in a tip end portion of the second portion of the frame such that an upper end surface thereof is opposed to the joining tool, and configured to receive lapped works, wherein
   the joining tool is moved along the axis by the motion motor while the joining tool is rotated by the rotation motor,
   the pin and the shoulder portion are pressed against a predetermined joint spot of the lapped works to be joined and inserted into the predetermined joint spot heated and softened due to friction heat,
   portions of the lapped works that are in the vicinity of the predetermined joint spot are stirred by using the rotating pin and shoulder portion, thereby leading to the lapped works being fused at the predetermined joint spot,
   the joining tool is then pulled out along the axis by the motion motor,
   the joining tool is substantially prevented from moving in a direction crossing an axial direction thereof with respect to the lapped works from the time when the pin and the shoulder portion are pressed against the predetermined joint spot of the lapped works to the time when the joining tool is pulled out, and
   whereby the lapped works are spot-joined at the predetermined joint spot.

2. The spot joining device according to claim 1, wherein the motion motor is a servo motor.

3. The spot joining device according to claim 1, wherein the rotation motor is an induction motor.

4. The spot joining device according to claim 1, wherein the rotation motor is a servo motor.

5. A spot joining device comprising:
   a joining tool having a column-shaped shoulder portion at a tip end portion thereof and a pin protruding from an end face of the shoulder portion along an axis thereof;
   a frame having a first portion and a second portion fixed to a lower end of the first portion to extend downwardly in a substantially L-shape;
   a linear guide provided on the first portion of the frame for guiding the joining tool to be movable upwardly and downwardly alone the axis thereof; said linear guide comprising a guide rail extending in parallel with the axis of the joining tool, and a guide member moveably attached to the guide rail and rotably supporting the joining tool;

a rotation motor for rotating the joining tool around the axis thereof;

a motion motor provided on the frame for moving the joining tool along the axis thereof, and a column shaped receiving member provided in a tip end portion of the second portion of the frame such that an upper end surface thereof is opposed to the joining tool, and configured to receive lapped works, wherein a ball screw is mounted on the frame, the ball screw comprising:

a screw shaft mounted on the frame and driven by the motion motor to rotate; and a nut mounted on the guide member and screwed on the screw shaft, and wherein the joining tool is moved along the axis by the motion motor while the joining tool is rotated by the rotation motor, the pin and the shoulder portion are pressed against a predetermined joint spot of the lapped works to be joined and inserted into the predetermined joint spot heated and softened due to friction heat, portions of the lapped works that are in the vicinity of the predetermined joint spot are stirred by using the rotating pin and shoulder portion, thereby leading to the lapped works being fused at the predetermined joint spot, the joining tool is then pulled out along the axis by the motion motor, the joining tool is substantially prevented from moving in a direction crossing an axial direction thereof with respect to the lapped works from the time when the pin and the shoulder portion are pressed against the predetermined joint spot of the lapped works to the time when the joining tool is pulled out, and whereby the lapped works are spot-joined at the predetermined joint spot.

6. The spot joining device according to claim 1, wherein the rotation motor is provided on the guide member.

7. The spot joining device according to claim 1, wherein the receiving member is disposed coaxially with the joining tool.

8. The spot joining device according to claim 1, wherein the spot joining device is a spot gun worn on a wrist of an articulated robot.

9. The spot joining device according to claim 1, wherein the spot joining device is a spot gun which is movably carried by an operator to perform spot joining operation therewith.

10. A spot joining method comprising the steps of:

preparing a joining tool having a column-shaped shoulder portion at a tip end portion thereof and a pin protruding from an end face of the shoulder portion along an axis thereof, a frame having a first portion and a second portion fixed to a lower end of the first portion to extend downwardly in a substantially L-shape, a linear guide provided on the first portion of the frame for guiding the joining tool to be movable upwardly and downwardly along the axis thereof, a rotational motor for rotating the joining tool around the axis thereof, a motion motor for moving the joining tool along the axis thereof, and a column-shaped receiving member provided in a tip end portion of the second portion of the frame such that an upper end surface thereof is opposed to the joining tool, and configured to receive lapped works;

rotating the joining tool and pressing the shoulder portion against a predetermined joint spot of lapped works to be joined;

inserting the pin and the shoulder portion into the predetermined joint spot of the lapped works heated and softened due to friction heat;

stirring portions of the lapped works that are in the vicinity of the predetermined joint spot by using the rotating pin and shoulder portion, thereby leading to the lapped works being fused at the predetermined joint spot, pulling out the joining tool along the axis, and substantially preventing the joining tool from moving in a direction crossing an axial direction thereof with respect to the lapped works from the time when the pin and the shoulder portion are pressed against the predetermined joint spot of the lapped works to the time when the joining tool is pulled out, thereby performing spot joining of the lapped works at the predetermined joint spot.

11. The spot joining method according to claim 10, wherein a receiving member is disposed opposite to a tip end portion of the joining tool, the receiving member having a flat receiving face on which the lapped works to be joined are placed and receiving a pressing force from the joining tool pushing against the lapped works.

12. A spot joining method for spot-joining lapped works by using the spot joining device according to in claim 1.

13. The spot joining method according to claim 10, wherein the lapped works are comprised of two or more works.

14. The spot joining method according to claim 10, wherein the lapped works are a plurality of flat-plate shaped or three-dimensionally shaped works having lapped faces to be spot-joined.

15. The spot joining method according to claim 10, wherein the lapped works are works made of metal, words made of synthetic resin, or works in which decorative sheets made of synthetic resin are bonded to outer faces of metal plates.

16. The spot joining method according to claim 10, wherein the lapped works are outer plates of an automobile.

17. The spot joining method according to claim 10, wherein the lapped works are outer plates of a railway vehicle.

18. A method of manufacturing an outer plate of an automobile by a method for spot-joining lapped works and forming a concave portion at a joint spot of the lapped works, the method comprising the steps of:

rotating a joining tool having a column-shaped shoulder portion at a tip end portion thereof and a pin protruding from an end face of the shoulder portion along an axis thereof with the pin and the shoulder portion pressed against a predetermined joint spot of lapped works to be joined which constitute an outer plate of an automobile, inserting the pin and the shoulder portion into the predetermined joint spot of the lapped works heated and softened due to friction heat, stirring portions of the lapped works that are in the vicinity of the predetermined joint spot by using the rotating pin and shoulder portion, thereby leading to the lapped works being fused at the predetermined joint spot while forming a concave portion of the joint spot of the lapped works on which the spot-joining was performed so as to substantially conform in shape to an outer shape of the pin and the shoulder portion of the joining tool, pulling out the joining tool along the axis, and substantially preventing the joining tool from moving in a direction crossing an axial direction thereof with respect to the lapped works from the time when the pin and the shoulder portion are pressed against the predetermined joint spot of the lapped works to the time when the joining tool is pulled out, thereby performing spot-joining of the lapped works at the predetermined joint spot.

19. The spot joining device according to claim 1, wherein a concave portion is formed at the joint spot of the lapped works on which the spot-joining was performed so as to conform in shape to the pin and the shoulder portion of the joining tool.

20. The spot joining method according to claim 10, wherein a concave portion is formed at the joint spot of the lapped works on which the spot-joining was performed so as to conform in shape to the pin and the shoulder portion of the joining tool.

21. An outer plate of an automobile containing a concave portion, manufactured in accordance with the method of claim 18.

* * * * *